(12) United States Patent
Kim

(10) Patent No.: US 9,467,799 B2
(45) Date of Patent: Oct. 11, 2016

(54) METHOD OF CONTROLLING NFC-RELATED SERVICE PROVISION AND APPARATUS PERFORMING THE SAME

(71) Applicant: SAMSUNG ELECTRONICS CO., LTD., Suwon-si, Gyeonggi-do (KR)

(72) Inventor: Byoung-yue Kim, Suwon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 14/298,247

(22) Filed: Jun. 6, 2014

(65) Prior Publication Data

US 2015/0038086 A1    Feb. 5, 2015

(30) Foreign Application Priority Data

Aug. 1, 2013 (KR) .................. 10-2013-0091589

(51) Int. Cl.

| H04B 7/00 | (2006.01) |
| H04W 4/00 | (2009.01) |
| G06F 21/35 | (2013.01) |
| H04L 29/06 | (2006.01) |
| H04W 12/06 | (2009.01) |

(52) U.S. Cl.
CPC .............. *H04W 4/008* (2013.01); *G06F 21/35* (2013.01); *H04L 63/08* (2013.01); *H04W 12/06* (2013.01)

(58) Field of Classification Search
CPC ... H04W 4/008; H04W 12/08; H04W 12/06; H04W 4/023; H04W 8/205; H04W 92/18; H04B 5/0056; H04B 5/00; H04B 5/0025; H04B 5/0062; H04B 5/0081; G06K 7/10237; G06K 7/0021; G06F 3/1253; G06F 3/1288

USPC ....................................... 455/41.3; 340/10.51
See application file for complete search history.

(56) References Cited

U.S. PATENT DOCUMENTS

| 8,688,834 B2 * | 4/2014 | Fujimoto ............ | H04L 61/2015 709/222 |
| 2006/0091196 A1 * | 5/2006 | Durham .............. | H04L 63/0823 235/375 |
| 2009/0033972 A1 * | 2/2009 | Kato ................... | H04N 1/00347 358/1.13 |
| 2009/0036056 A1 * | 2/2009 | Oshima .............. | H04M 1/7253 455/41.3 |
| 2010/0141431 A1 * | 6/2010 | Boss ...................... | H04L 12/10 340/539.13 |
| 2011/0116125 A1 | 5/2011 | Park | |

(Continued)

FOREIGN PATENT DOCUMENTS

| EP | 2432277 A1 | 3/2012 |
| EP | 2432277 A9 | 12/2012 |

OTHER PUBLICATIONS

European Office Action dated Dec. 22, 2014 in corresponding European Patent Application No. 14175990.2.

(Continued)

*Primary Examiner* — Ayodeji Ayotunde
*Assistant Examiner* — Max Mathew
(74) *Attorney, Agent, or Firm* — Staas & Halsey LLP

(57) ABSTRACT

An apparatus includes an NFC tag to which information about at least one near-field communication (NFC) service, from among NFC services that are provided based on NFC, is written; a user interface to receive an input of log-in information from a user; a control unit to determine an NFC service that is allowed for the user in response to log in of the user; and an NFC module to update information that is written to the NFC tag according to a result of the determining.

20 Claims, 14 Drawing Sheets

(56) References Cited

U.S. PATENT DOCUMENTS

| | | |
|---|---|---|
| 2011/0286028 A1 | 11/2011 | Kinouchi et al. |
| 2013/0065520 A1 | 3/2013 | Skutnick |
| 2013/0072116 A1 | 3/2013 | Song et al. |
| 2013/0084885 A1 | 4/2013 | Jain et al. |
| 2013/0110728 A1* | 5/2013 | Kobres .................. G06Q 30/06 705/75 |
| 2013/0185769 A1* | 7/2013 | Jian ........................ H04L 63/08 726/4 |
| 2013/0215467 A1* | 8/2013 | Fein ..................... G06F 3/1204 358/1.15 |
| 2013/0314214 A1* | 11/2013 | Leica ................... H04B 5/0056 340/10.1 |
| 2014/0227972 A1* | 8/2014 | Swaminathan ...... H04B 5/0031 455/41.1 |

OTHER PUBLICATIONS

European Search report dated Dec. 11, 2014 in corresponding European Patent Application No. 14175990.2.

* cited by examiner

METHOD OF CONTROLLING NFC-RELATED SERVICE PROVISION AND APPARATUS PERFORMING THE SAME

CROSS-REFERENCE TO RELATED APPLICATIONS

This application claims the benefit of Korean Patent Application No. 10-2013-0091589, filed on Aug. 1, 2013, in the Korean Intellectual Property Office, the disclosure of which is incorporated herein in its entirety by reference.

BACKGROUND

1. Field

One or more embodiments of the present invention relate to a method of controlling provision of near-field communication (NFC)-related services and an apparatus, such as image-forming apparatus, for performing the same.

2. Description of the Related Art

Near-field communication (NFC) is a standard for proximity near-field wireless communication. NFC enables wireless communication between electronic devices with low power consumption at a frequency of 13.56 MHz and at a distance of 10 cm or less. The NFC was jointly developed by NXP Semiconductors in the Netherlands and Sony in Japan. NFC supports a transmission rate of 424 kbps. NFC is based on proximity and provides an encryption technology, and thus, ensures high security. NFC also enables terminals to recognize each other in 1/10 second or less without having to go through a complicated pairing procedure. NFC includes smart card-type proximity wireless communication using a radio-frequency identification (RFID) technology. Compared to a smart card, NFC is bidirectional, and has a relatively large storage memory capacity. NFC may be also applied to various types of services. Accordingly, NFC technology may be applied to smart phones that have been recently commercialized.

SUMMARY

One or more embodiments of the present invention include a method of providing, by dynamically configuring a service that is provided via near-field communication (NFC), a service appropriate for a use environment and enhancing security of the service that is provided via the NFC. Embodiments of the present invention are not limited thereto, and other embodiments of the present invention may be inferred from the following disclosure of embodiments of the present invention.

Additional aspects will be set forth in part in the description which follows and, in part, will be apparent from the description, or may be learned by practice of the presented embodiments.

According to one or more embodiments of the present invention, a method, performed by an image-forming apparatus, of controlling service provision includes: writing information about at least one NFC service, from among NFC services that are provided based on NFC, to an NFC tag; determining an NFC service that is allowed for the user in response to a user log-in; and updating information that is written to the NFC tag according to a result of the determining.

According to one or more embodiments of the present invention, an apparatus, such as an image-forming apparatus, which includes at least one of a printing module, a scanner module, and a fax module, includes an NFC tag to which information about at least one NFC service, from among NFC services that are provided based on NFC, is written; a user interface to receive an input of log-in information from a user; a control unit for determining an NFC service that is allowed for the user in response to log-in of the user; and an NFC module to update information that is written to the NFC tag according to a result of the determining.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1A:
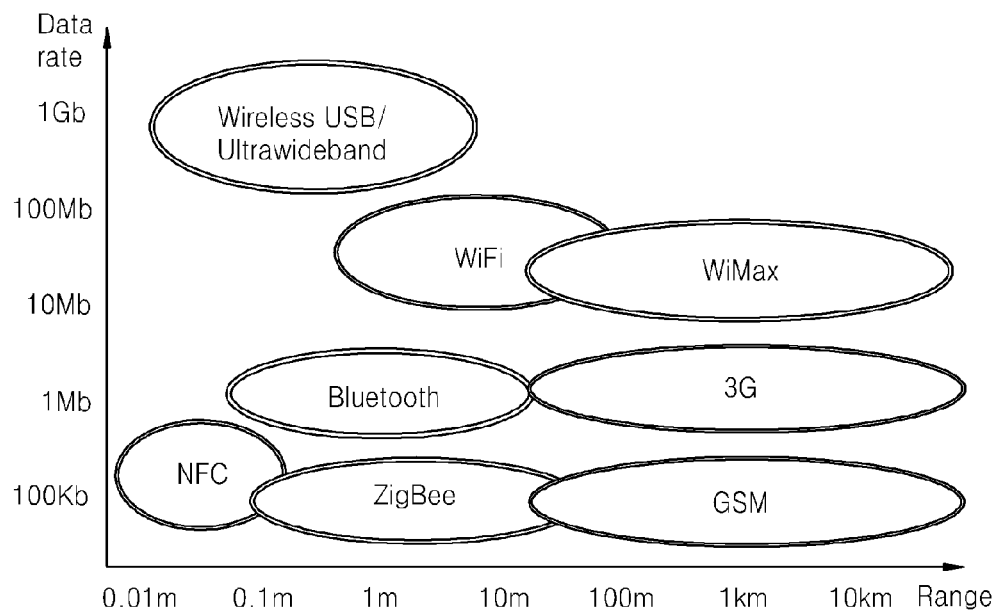
FIG. 1A is a diagram for comparing a data rate and a communication range between near-field communication (NFC) and other wireless communication methods.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present invention will be described in more detail with reference to the accompanying drawings.

FIG. 1A is a diagram for comparing a data rate and a communication range between near-field communication (NFC) and other wireless communication methods. Referring to FIG. 1A, compared to other wireless communication methods, NFC may operate only within a distance of about 10 cm. Unlike Bluetooth or wireless fidelity (Wi-Fi) that allows communication within a distance from several to tens of meters, NFC allows communication only within a short distance of about 10 cm.

NFC may be compared to other wireless communication methods such as Bluetooth, Zigbee, and so on, as shown in Table 1.

TABLE 1

| Technology | Frequency in use | Security | Scope of Standards | Main service area |
|---|---|---|---|---|
| NFC | 13.56 MHz | Encryption applied | International Standards | Contactless payment, RFID, File transmission |
| Bluetooth | 2.4 GHz | Not applicable | International Standards | File transmission |
| Zigbee | 2.4 GHz | Not applicable | International Standards | Device control Radio frequency identification (RFID) |
| 900 MHz RFID | 900 MHz | Not applicable | Domestic (KR) standards | RFID |

That is, compared to the other wireless communication methods, NFC operates only within a distance of about 10 cm, and an encryption technology is applied to NFC. Thus, NFC provides high security. Accordingly, if NFC is combined and used with other high-rate wireless communication methods such as third generation (3G), fourth generation (4G), or Wi-Fi, communication may be executed more efficiently between devices. For example, if NFC technology and Bluetooth technology are combined with each other, the NFC technology may be used to connect devices to each other (through certification), and the Bluetooth technology may be used to transmit data between devices. Thus, communication between devices may be efficiently performed.

Figure 1B:
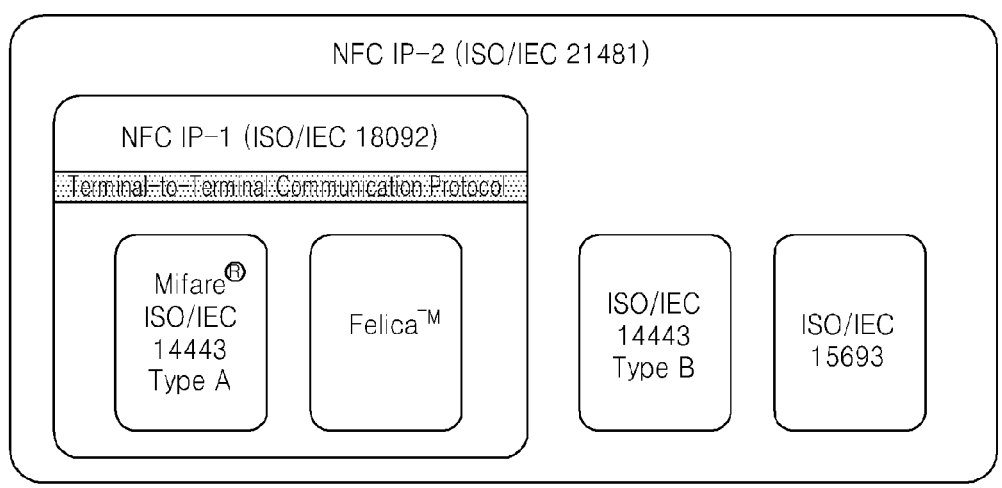
FIG. 1B is a diagram for showing standards for NFC technology.

FIG. 1B is a diagram for showing standards for NFC technologies.

Referring to FIG. 1B, an NFC standard technology complies with the international organization for standardization (ISO) standards, and is an extension of the ISO 14443 proximity-card standard. FIG. 1B shows an inclusion relationship between NFC Interface Protocol (IP)-1, which is standardized in ISO/international electrotechnical commission (IEC) 18092, and NFC IP-2, which is standardized in ISO/IEC 21481. ISO/IEC 14443 Type A and Type B, FeliCa, and ISO/IEC 15693 are international standards for a proximity card, which operates at a frequency of 13.56 MHz. The ISO/IEC 18092 standard defines a communication mode for an NFC interface and protocol.

Figure 2A:
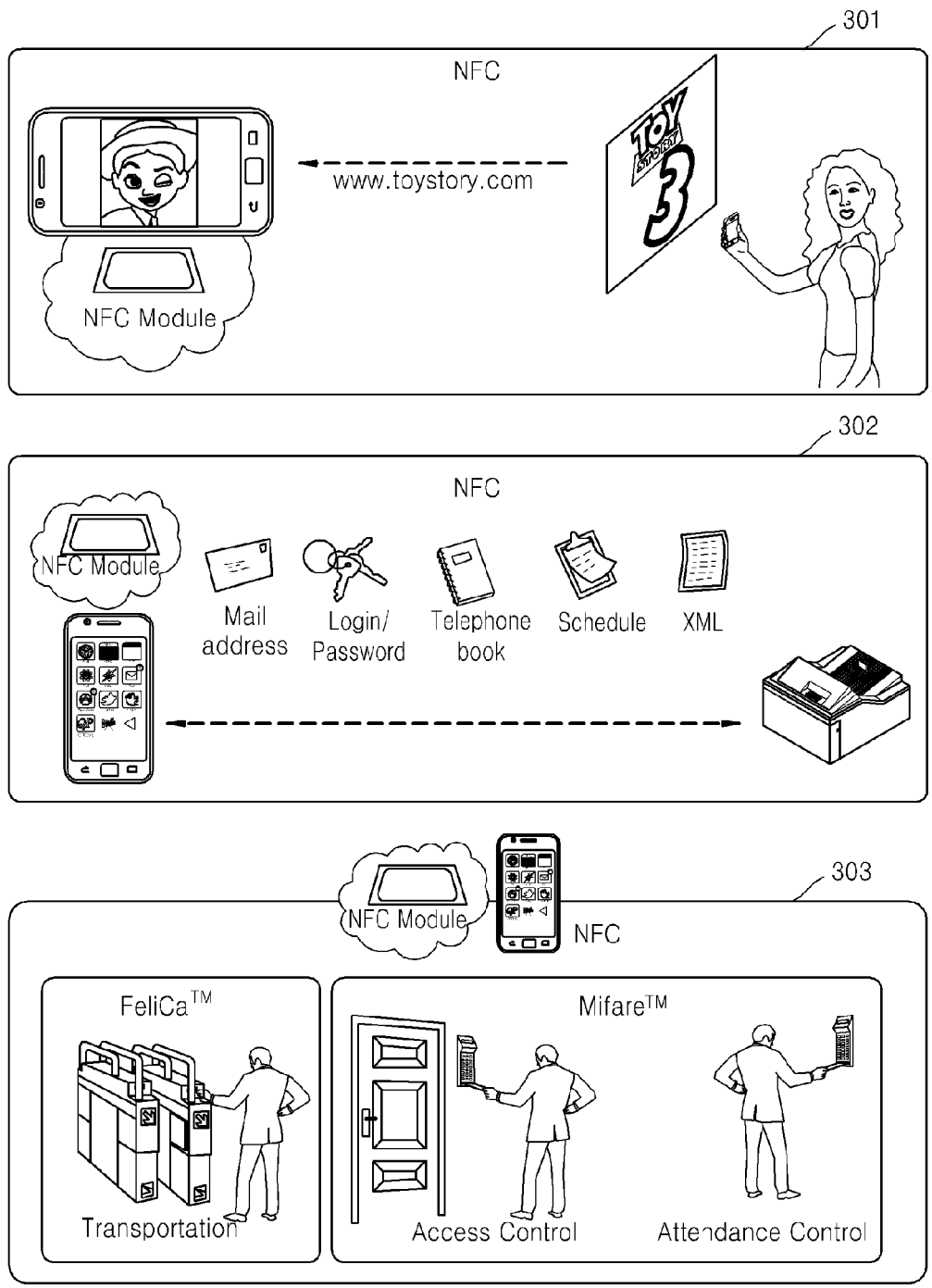
FIGS. 2A and 2B are diagrams for explaining three communication modes for NFC.
Figure 2B:
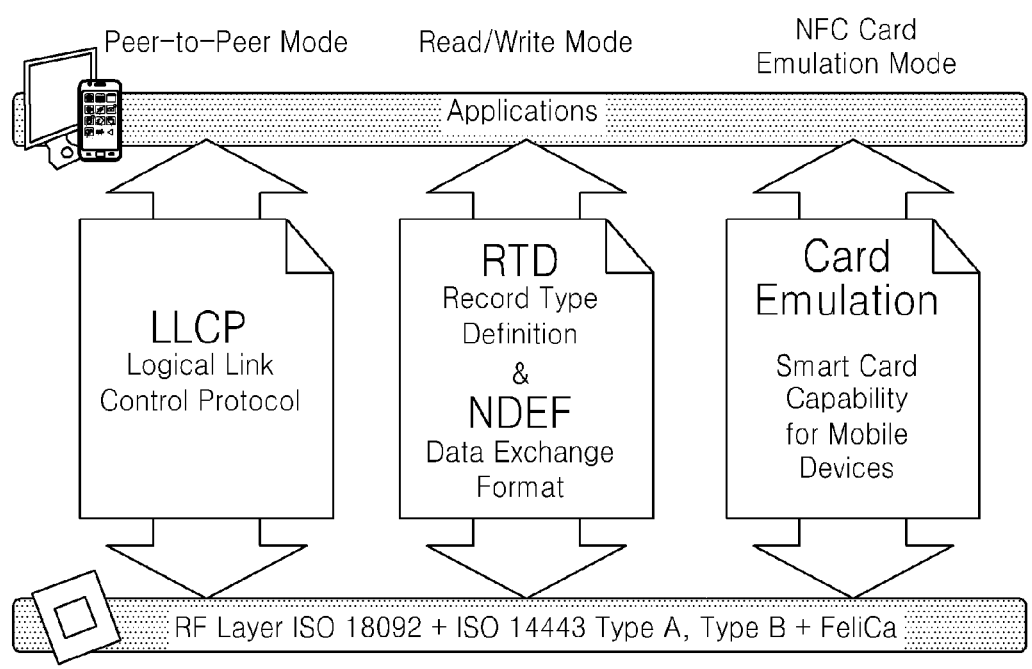

FIGS. 2A and 2B are diagrams for explaining three communication modes for NFC.

Referring to FIG. 2A, an NFC forum classifies and standardizes main communication modes for NFC into three modes, including a reader/writer mode 301, a peer-to-peer (P2P) mode 302, and a card emulation mode 303. The three communication modes for the NFC may be summarized as shown in Table 2.

TABLE 2

| | ISO/IEC 15693 | ISO/IEC 18092 | ISO/IEC 14443 |
|---|---|---|---|
| Operation mode | Reader-to-tag communication (VCD2 mode) | Device-to-device communication (P2P mode) | Reader-to-tag communication (PCD1 mode) |
| Power supply | Passive | Active and passive | Passive |
| Communication range | 1 m | 10~20 cm | 10 cm |
| Data rate | Equal to or less than 26 kbps | 106, 212, 424 Kbps | 106 Kbps |

(PCD: Proximity Coupling Device, VCD: Vicinity Coupling Device)

The reader/writer mode 301 supports a function in which a device, in which an NFC chipset is built, operates as a reader for reading an NFC tag or a writer for writing information to the NFC tag. The device, in which the NFC chipset is built, and the NFC tag may be separate from each other. Additionally, the NFC tag may be located outside a device that operates in a reader/writer mode. For example, the NFC tag may be a passive tag that is included in or attached to another device. If the other device does not include an NFC chipset, the other device may not read from or write to the attached passive tag. If the NFC tag is an active tag that is included in another device, the other device may read from and write to the NFC tag by using the NFC function. It may be difficult to later install the active tag in a device that does not support the NFC function. However, the active tag may be later detachably attached to a device that does support the NFC function, like a sticker.

Additionally, the P2P mode 302 supports a bi-directional communication between two NFC devices. In order to establish a connection between the two NFC devices, an NFC P2P initiator searches for a host that is an NFC P2P target, and transmits data in an NFC data exchange format (NDEF) message format. In the P2P mode 302, devices may exchange data. However, since a data transmission rate is up to 424 kbps, the P2P mode 302 is appropriate for exchanging a small size of data.

The card emulation mode 303 is a mode whereby a device, in which an NFC chipset is built, operates like a smart card that is standardized in ISO/IEC 14443. Accordingly, the card emulation mode 303 is compatible with Felica by Sony and MiFare by Philips, as well as an ISO 14443 that is an international standard for a proximity card.

In order to systematically provide the three communication modes of the NFC, a protocol is standardized as shown in FIG. 2B. Referring to FIG. 2B, a software configuration in an NFC system is shown.

A logical link control protocol (LLCP) is a protocol that functions to connect and control layers via a communication network. An NDEF message is a basic message structure that is defined in an NFC communication protocol. The NDEF defines a record format for a message exchange between a device and a tag that are compatible with an NFC forum. The NDEF is a standard exchange format for a uniform resource identifier (URI), a smart poster, and others.

The NDEF message includes one or more NDEF records. The NDEF record includes a payload that is described with regard to a type, a length, and an optional identifier. The NDEF payload means application data that is included in the NDEF record. A record type definition (RTD) defines a record type and a type name that may correspond to the NDEF record.

Figure 3A:
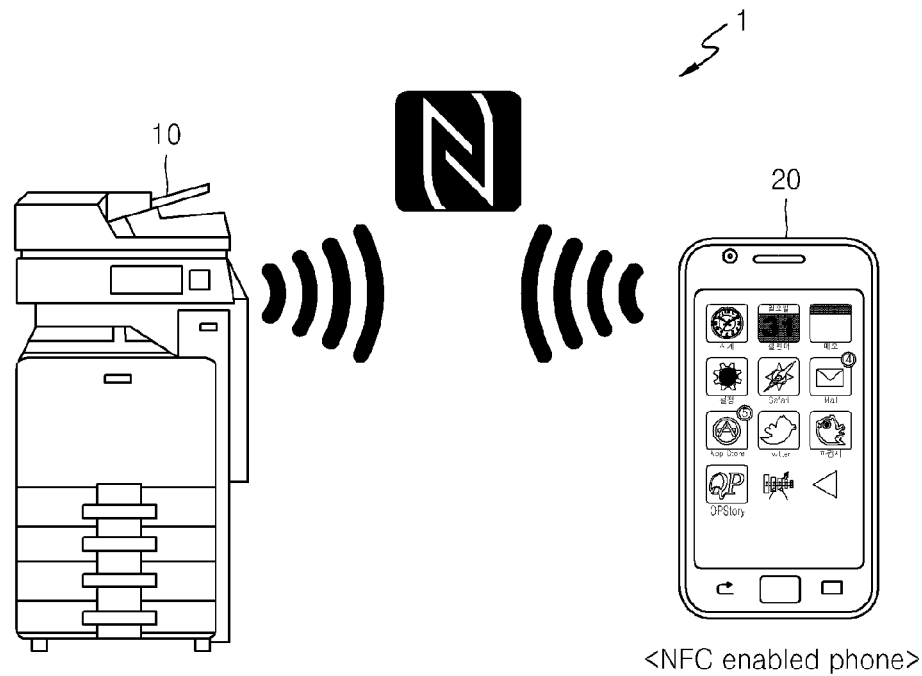
FIG. 3A is a diagram illustrating an NFC environment according to an embodiment of the present invention.

FIG. 3A is a diagram illustrating an NFC environment 1 according to an embodiment of the present invention. Referring to FIG. 3A, the NFC environment 1 includes an image-forming apparatus 10 and a mobile terminal 20 that respectively support NFC. Since the image-forming apparatus 10, shown in FIG. 3A, already includes an NFC chipset, the image-forming apparatus 10 may operate in the P2P mode 302 that uses an NFC function, with the mobile terminal 20. However, it will be understood by those of ordinary skill in the art that the image-forming apparatus 10, shown in FIG. 3A, may operate in the reader/writer mode 301 or the card emulation mode 303, as well as in the P2P mode 302.

Figure 3B:
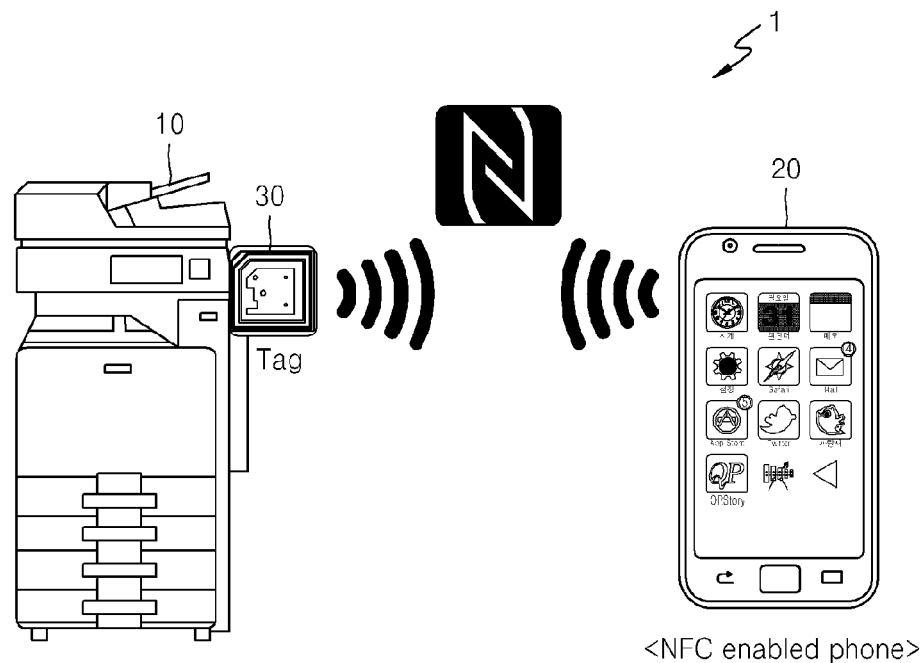
FIG. 3B is a diagram illustrating the NFC environment that is similar to that shown in FIG. 1A, according to an embodiment of the present invention.

FIG. 3B is a diagram illustrating the NFC environment 1 that is similar to that shown in FIG. 1A, according to an embodiment of the present invention. Referring to 3B, like in FIG. 3A, the NFC environment 1 includes the image-forming apparatus 10 that supports NFC and the mobile terminal 20 that supports NFC. With regard to a difference between FIGS. 3A and 3B, the image-forming apparatus 10, shown in FIG. 3A, employs an NFC chipset. On the other hand, the image-forming apparatus 10, shown in FIG. 3B. employs an NFC tag 30. When the NFC chipset is employed, the NFC chipset includes all functions of the NFC tag 30. For example, if the NFC chipset operates in the card emulation mode 303, the NFC chipset may perform the same function as the NFC tag 30. The function of the NFC tag 30 includes transmission of information, which is recorded in the NFC tag 30, to the mobile terminal 20 via an NFC connection.

The NFC tag 30 may be a read/write tag, instead of a read-only tag or a write once tag, so that the NFC tag 30 may be recorded or modified by the mobile terminal 20 or the image-forming apparatus 10 that is shown in FIG. 3. The read-only tag is a tag that has physical characteristics in which once-written data may not be modified. The read/write tag is a tag that has physical characteristics in which once-written data may be deleted or modified. Thus, classification of a tag into the read-only tag and the read/write tag is different from classification of a tag into the passive tag and the active tag.

The NFC tag 30 needs to be an active tag, so that the NFC tag 30 is written and modified by the image-forming apparatus 10 that is shown in FIG. 3B. An integrated circuit (IC) of the NFC tag 30 and the image-forming apparatus 10 that is shown in FIG. 3B need to include a transmission line for transmitting or receiving data or an NFC chipset, so that the NFC tag 30 operates as an active tag.

Accordingly, if the NFC tag 30 is attached to an image-forming apparatus that does not include a transmission line or an NFC chipset, the NFC tag 30 operates as a passive tag, instead of as an active tag. If the NFC tag 30 operates as an active tag, the mobile terminal 20 may not read or edit information that is written in the NFC tag 30. However, the image-forming apparatus 10, shown in FIG. 3B, may not read or edit information that is written in the NFC tag 30. If the NFC tag 30 operates as an active tag, the mobile terminal 20 and the image-forming apparatus 10 that is shown in FIG. 3B, may read or edit information that is written in the NFC tag 30. Since the active tag includes all functions of a passive tag, the active tag may have more advantageous functions than the passive tag. However, the passive tag may be easily installed in the conventional image-forming apparatus, compared to the active tag.

The NFC tag 30 may not be built in the image-forming apparatus, shown in FIG. 3B, when the image-forming apparatus is manufactured. Only when the NFC tag 30 is later installed in the image-forming apparatus 10, shown in FIG. 3B, may the image-forming apparatus 10 communicate with the mobile terminal 20 by using the NFC function. The image-forming apparatus 10 may include at least one slot for installing the active or passive NFC tag 30.

It will be understood by those of ordinary skill in the art that if the active NFC tag 30 is later installed in the image-forming apparatus 10 that is shown in FIG. 3B, the operation of the NFC environment 1, which will be described with regard to the current embodiment, may become the same as the operation of the image-forming apparatus 10 that is shown in FIG. 3A.

For convenience of description with regard to the current embodiment, it is described that only the image-forming apparatus 10 and the mobile terminal 20 are present in a pair. However, it will be understood by those of ordinary skill in the art that the NFC environment 1 may include various electronic apparatuses that supports the NFC function, and the various electronic apparatuses may operate in the same way as in the current embodiment.

Figure 3C:
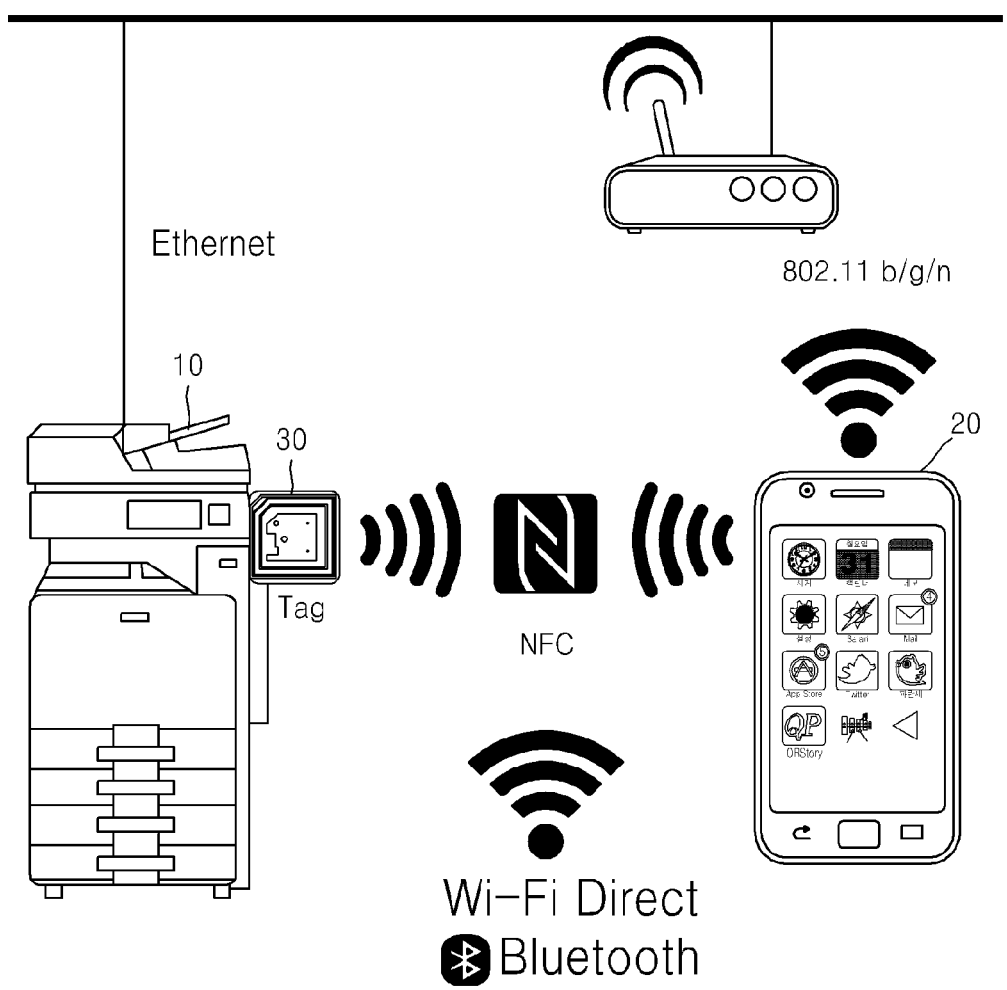
FIG. 3C is a diagram illustrating a wireless communication environment in which an image-forming apparatus and a mobile terminal are present, according to an embodiment of the present invention.

FIG. 3C is a diagram illustrating a wireless communication environment 2 in which the image-forming apparatus 10 and the mobile terminal 20 are present, according to an embodiment of the present invention. Referring to FIG. 3C, the NFC environment 1 and peripheral wired or wireless networks are shown. The NFC environment 1 may interwork with peripheral wired or wireless networks such as Wi-Fi Direct, Bluetooth, Ethernet, 802.11a/b/g/n or so on. In the wireless communication environment 2, the image-forming apparatus 10 and the mobile terminal 20 may be wired or wirelessly connected to each other via a Wi-Fi Direct connection or via a Wi-Fi access point (AP) 802.11a/b/g/n.

Figure 4:
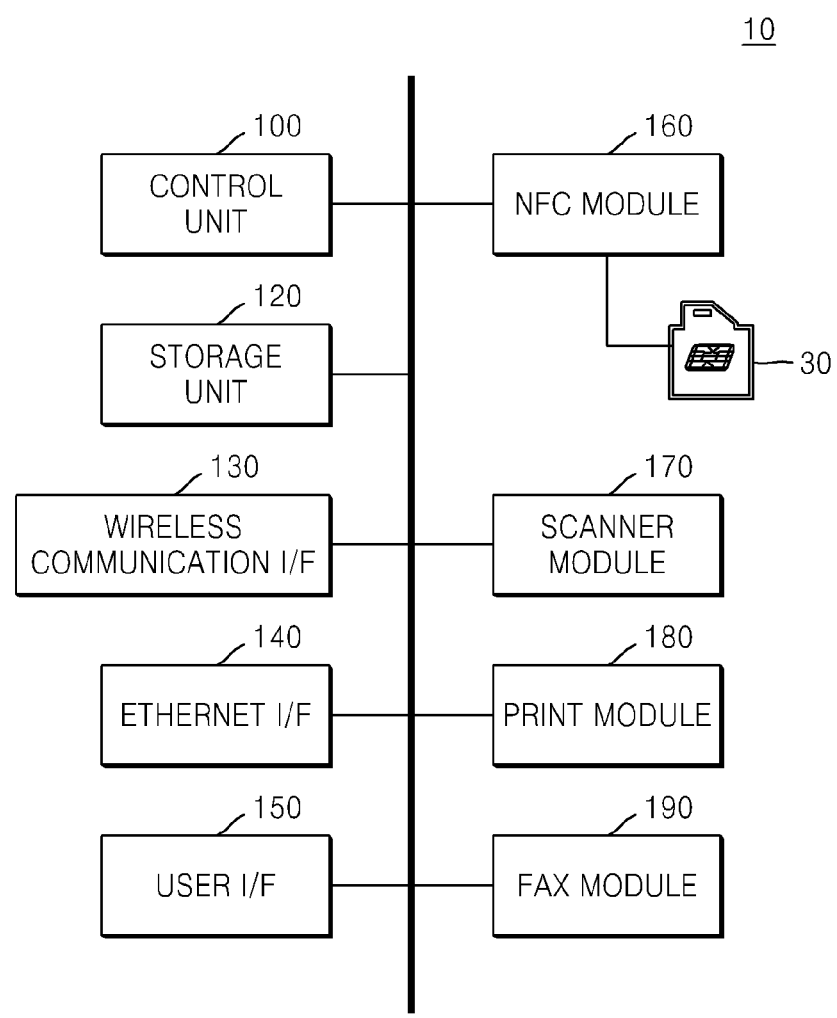
FIG. 4 is a diagram illustrating the image-forming apparatus 10 according to an embodiment of the present invention.

FIG. 4 is a diagram illustrating the image-forming apparatus 10 according to an embodiment of the present invention. Hereinafter, a description will be provided with regard to the image-forming apparatus 10 that includes an active tag.

Referring to FIG. 4, the image-forming apparatus 10 includes a control unit 100, a storage unit 120, a wireless communication interface 130, an Ethernet interface 140, a user interface 150, an NFC module 160, a scanner module 170, a print module 180, a facsimile (FAX) module 190, and the NFC tag 30.

It will be understood by those of ordinary skill in the art that general-use elements, other than the above-described elements, may be further included. Additionally, the elements, shown in FIG. 4, may not be essential elements. The image-forming apparatus 10 may be implemented by using more or less elements than those shown in FIG. 4. For example, the image-forming apparatus 10 is shown as a multifunction peripheral (MFP). However, a printer, a scanner, a FAX machine, and/or a copy machine may be the image-forming apparatus 10.

Each of the print module 180, the scanner module 170, and the FAX module 190 performs a function of printing, scanning, and faxing. The printing module 180 and the scanner module 170 may be combined to perform a copying function.

The user interface 150 is hardware which a user uses to check information about the image-forming apparatus 10 and to input a command to the image-forming apparatus 10. The user interface 150 may be a touchscreen in which a user operates the image-forming apparatus 10, or information that is processed by the image-forming apparatus 10 is displayed. The user interface 150 may be configured in various ways according to a product. The user interface 150 may be configured simply in a type of two or four lines on a display such as a liquid-crystal display (LCD) or light-emitting display (LED). Otherwise, the user interface 150 may be configured with a graphical user interface (GUI), to allow various graphical expressions. The user interface 150 may include a touch sensor for detecting a user gesture. The user interface 150 may be implemented as a capacitive touchscreen or an electrostatic touchscreen. The user interface 150 may include a tactile sensor or a proximity sensor. The user interface 150 may be configured with a key pad, a dome switch, a jog wheel, a jog switch or a hardware (HW) button.

The Ethernet interface 150 refers to hardware that performs wired Ethernet communication in accordance with the institute of electrical and electronics engineers (IEEE) 802.3.

The wireless communication interface 130 may establish a wireless connection to the mobile terminal 20 via a Wi-Fi connection using an AP or via a Wi-Fi Direct connection. The wireless communication interface 130 may establish a wireless connection with the mobile terminal 20, and exchange data, which is necessary for an image-forming work, with the mobile terminal 20 via the wireless connection. The wireless connection may be a Wi-Fi connection or a Wi-Fi Direct connection, but is not limited thereto. Unless it is specified that Wi-Fi Direct is excluded from Wi-Fi, it may be interpreted that Wi-Fi includes Wi-Fi Direct.

Although not illustrated, the image-forming apparatus may further include a web browser that accesses a web page via the wireless communication interface 130 or the Ethernet interface 140.

The storage unit 120 stores printing data, FAX documents, scanned documents, and e-mail documents. The storage unit 120 may include a folder (hereinafter referred to as a document box) which is generated according to a file server function of the image-forming apparatus 10. The document box may include a personal box that is generated for each user and a common box that allows use by all users. A file that may be stored in the document box may include a print job, print data in a page description language (PDL), rendered print data, an image file, or a word document, but is not limited thereto. The storage unit 120 also stores firmware of the image-forming apparatus 10.

The control unit 100 controls all operations of the image-forming apparatus 10. Information, which is necessary for control, is stored in the storage unit 120 and read as necessary.

The NFC module 160 includes a slot for mounting the NFC tag 30. The NFC module 160 supplies power to the NFC tag 30 so that the NFC tag 30 operates as an active tag, and enables reading from or writing to the NFC tag 30.

Information regarding at least one NFC service, from among NFC services that are provided based on NFC, is written to the NFC tag 30. That is, according to control by the control unit 100, the NFC module 160 writes information regarding an NFC service to the NFC tag 30.

The NFC service is an operation that is partially or entirely intervened by the NFC module 160 or the NFC tag 30, from among various operations that may be performed by the image-forming apparatus 10. For example, if a particular operation is started as the NFC tag 30 is read, even if the NFC tag 30 or the NFC module 160 is not intervened any more after the operation is started, the particular operation is defined to be included in the NFC service.

For example, the NFC service may include at least one from among a first service for automating a wireless connection between the mobile terminal 20 and the image-forming apparatus 10, a second service for copying a setting of the image-forming apparatus 10 to the mobile terminal 20, and thus, applying the setting to another image-forming apparatus, a third service for rendering content of the mobile terminal 20 to a cloud resource (not illustrated), a fourth service for displaying information about an operation state and a consumable of the image-forming apparatus 10 on the mobile terminal 20, a fifth service for, if the mobile terminal 20 performs NFC tagging, scanning a document and transmitting the document to the mobile terminal 20, and a sixth service for, if the mobile terminal 20 performs NFC tagging, printing content of the mobile terminal 20.

A wireless connection between the mobile terminal 20 and the image-forming apparatus 10, according to the first service, is shown. A procedure of a Wi-Fi Direct connection between the mobile terminal 20 and the wireless communication interface 130 is described. The mobile terminal 20 reads information regarding the first service, which is written to the NFC tag 30, through NFC tagging. The information regarding the first service may include, for example, information regarding Wi-FI or Wi-Fi Direct, a media access control (MAC) address or an internet protocol (IP) address of the image-forming apparatus 10, or a certification code, such as a personal identification number (PIN), which is necessary for a wireless connection between the image-forming apparatus 10 and the mobile terminal 20. However, the information regarding the first service is not limited thereto.

The mobile terminal 20 searches for a candidate apparatus that may be Wi-Fi Direct connected to the mobile terminal 20, according to information regarding the first service. The mobile terminal 20 collects information such as a MAC address, an apparatus type, or a service set identifier (SSID) of candidate apparatuses (not illustrated), through a probe request and a probe response that are wireless local area network (LAN) packets.

The mobile terminal 20 identifies the image-forming apparatus 10 from among the candidate apparatuses, via the MAC or IP address that is read through the NFC tagging. The mobile terminal 20 tries a Wi-Fi Direct connection to the image-forming apparatus 10. A group formation procedure and a certification procedure for a security connection are executed between the mobile terminal 20 and the wireless communication interface 130. Group formation refers to determining which apparatus is a group owner (GO) or which apparatus is a client. Apparatuses, which belong to a formed group, need to be securely connected. In this case, a technology of a Wi-Fi protected setup (hereinafter referred to as WPS) is used. The WPS includes a PIN method or a push-button configuration (PBC) method. The PIN method is used to execute certification through a preset PIN code. The PBC method is used to execute certification by pushing a hardware or soft button that is included in the GO apparatus. The mobile terminal 20 executes certification by using the read certification code through the NFC tagging. The wireless interface 130 that is a GO allocates an IP address to the mobile terminal 20. The wireless communication interface 130 may include a dynamic host configuration protocol (DHCP) server module for IP address allocation. Through such a procedure, a Wi-Fi Direct connection between the wireless interface 130 and the mobile terminal 20 is established.

In the case of a Wi-Fi connection other than a Wi-Fi Direct connection, the wireless communication interface 130 may be the same infrastructure network as the mobile terminal 20, via AP 802.11 b/g/n. The image-forming apparatus 10 may allow access of apparatuses that are present in the same infrastructure network as the mobile terminal 20, an apparatus that has a particular IP, an apparatus that has a particular MAC, or an apparatus that has an account in the image-forming apparatus 10. If the mobile terminal 20 request the AP to transmit data to an IP address of the image-forming apparatus 10, the AP relays an address resolution protocol (ARP) table to the image-forming apparatus 10 through data transmission. The second through sixth NFC services, other than the first NFC service that is described above, will be described in detail later below.

Figure 8:
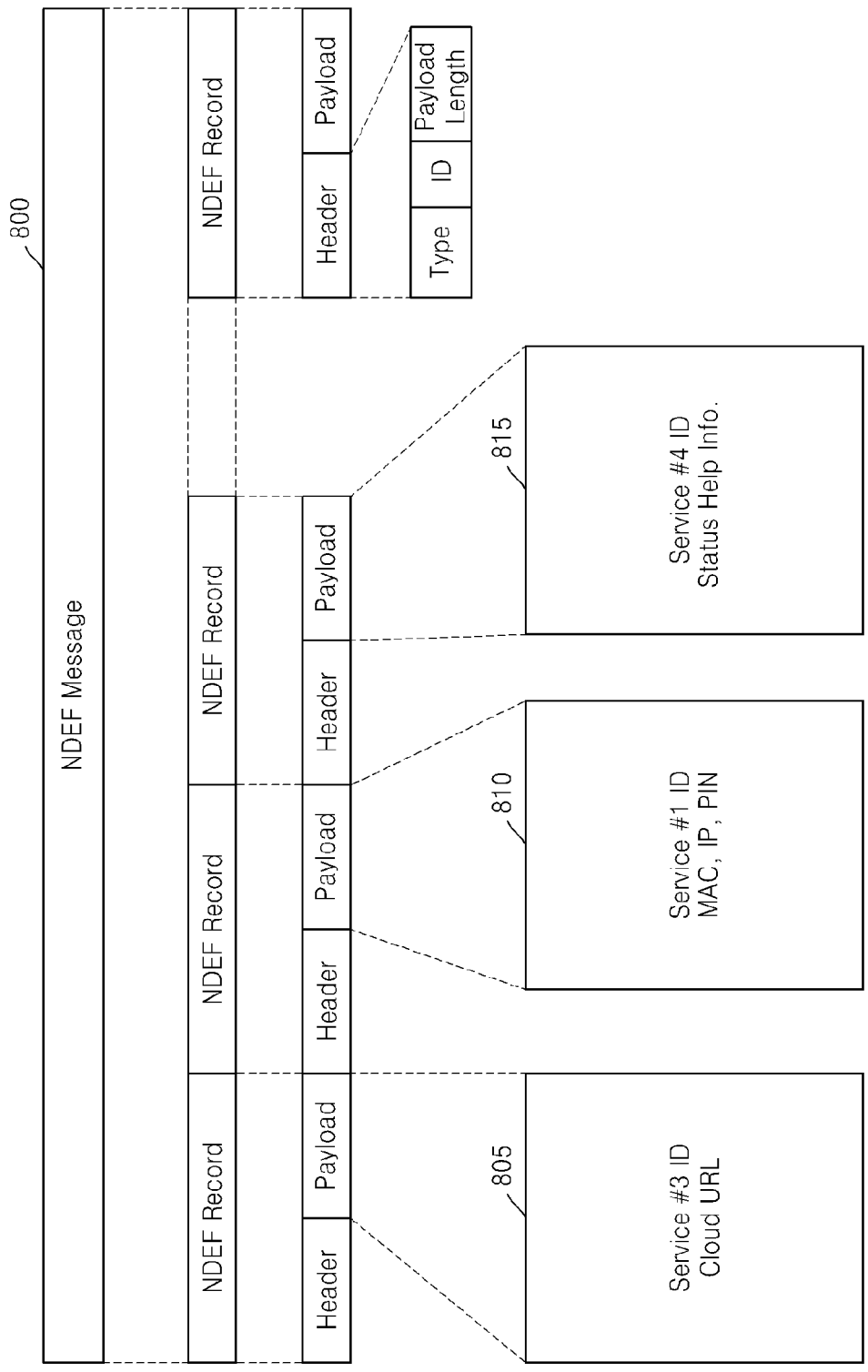
FIG. 8 is a diagram illustrating an NFC data exchange format (NDEF) message according to an embodiment of the present invention.

An NDEF message 800, which is written to the NFC tag 30, may be illustrated as shown in FIG. 8. The NDEF message 800 is generated by the control unit 100, and the NFC module 160 may write the NDEF message 800, shown in FIG. 8, to the NFC tag 30. Referring to FIG. 8, the NDEF message 800 includes a plurality of NDEF records. Information regarding one NFC service may be written to each of the NDEF records. In other words, an independent NDEF record may be formed for each NFC service unit.

The user interface 150 may receive login information and a login request from a user. The login information may be an identification (ID) or a password of a user, but is not limited thereto. For example, a user login may be performed by using various methods such as face recognition or fingerprint recognition. The user interface 150 may display whether a login is successful according to control by the control unit 100.

In response to the user login, the control unit 100 determines an NFC service that is allowed for the logged-in user. The control unit 100 may control the NFC module 160 to update information that is written to the NFC tag 30, by comparing the NFC service that is allowed for the user to information that is written to the NFC tag 30. If information regarding the NFC service that is not allowed for a user is written to the NFC tag 30 or if information regarding the NFC service that is allowed for a user is not written to the NFC tag 30, the control unit 100 may control the NFC module 160 so as to update the information that is written to the NFC tag 30. The control unit 100 may refer to an NFC service policy that is stored in the storage unit 120, so as to determine an NFC service that is allowed for a user. A description about the NFC service policy will be provided later below.

Figure 9:
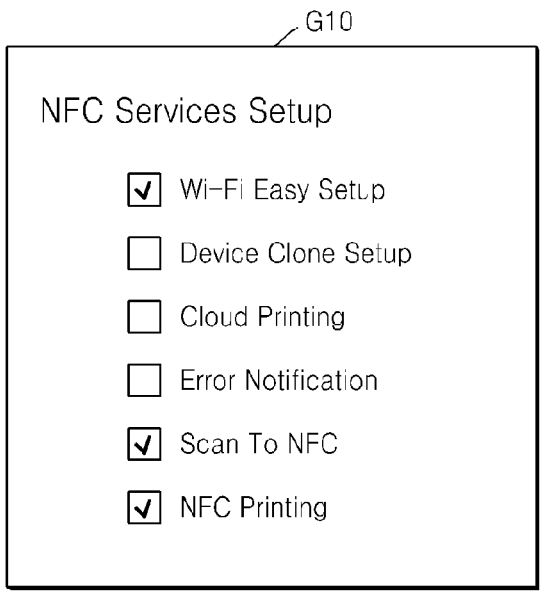
FIGS. 9 through 12 are diagrams illustrating a graphical user interface (GUI) of the image-forming apparatus according to embodiments of the present invention.

The user interface 150 may display a GUI for receiving a selection of an NFC service to be activated from among the NFC services, according to control by the control unit 100. For example, the user interface 150 displays a GUI G10, shown in FIG. 9, and receives a selection of an NFC service to be activated from the user. The image-forming apparatus 10 deactivates all NFC services, other than the selected NFC service.

Figure 13:
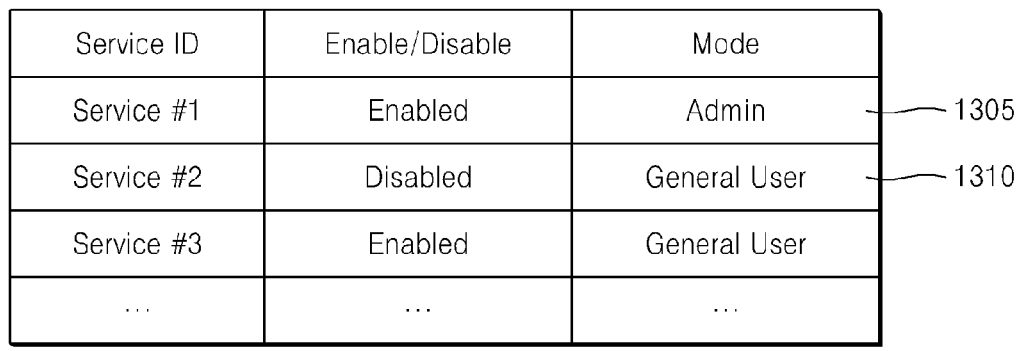
FIGS. 13 and 14 are diagrams illustrating an NFC service policy according to an embodiment of the present invention.
Figure 14:
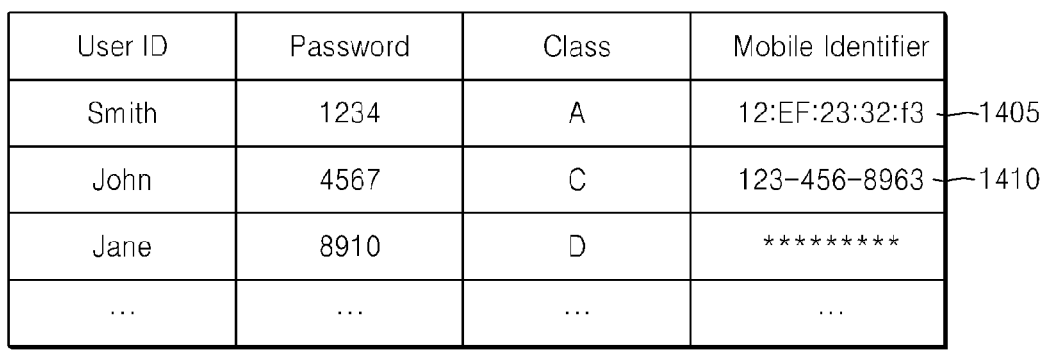

As such, if the activated NFC service is changed, the control unit 100 stores information regarding the changing in the storage unit 120. The storage unit 120 may store an NFC service policy that is shown in FIG. 13 or 14, according to a user input through a GUI that is shown in FIGS. 9 through 12. In other words, it may be understood that the user interface 150 receives an input of the NFC service policy via the GUI that is shown in FIGS. 9 through 12. The storage unit 120 may store information such as an apparatus setting, a network setting, or consumables of the image-forming apparatus 10. The storage unit 120 may store information to be written to the NFC tag 30.

The control unit 100 updates the NFC tag 30 by controlling the NFC module 160, so that information regarding the activated NFC service is written to the NFC tag 30.

Figure 10:
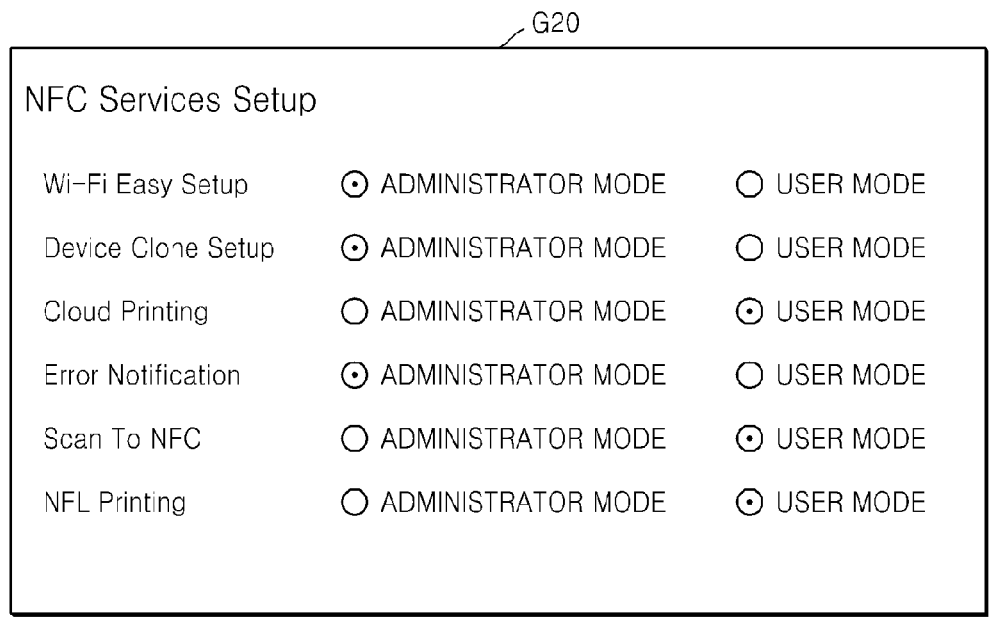

According to another embodiment of the present invention, the user interface 150 may display a GUI for receiving a selection of an NFC service, which will be provided to a user who obtained administration authority from among the NFC services, from the user. For example, the user interface 150 displays a GUI G20, shown in FIG. 10, and receives a selection of an NFC service, which will be provided to a user who obtained administration authority from among the NFC services, from the user. An administrator mode, shown in FIG. 10, is an operation mode of the image-forming apparatus 10 when a user who obtained administration authority logs in. A user mode, shown in FIG. 10, is an operation mode of the image-forming apparatus 10 when a general user who did not obtain administration authority logs in. An NFC service, which is selected for the general user mode, is allowed to be used in the administrator mode. However, an NFC service, which is selected for the administrator mode, is not allowed to be used in the general user mode. That is, an NFC service, provided to an administrator, includes a service that is provided to a general user. However, an NFC service, provided to a general user, does not include a service that is provided to an administrator.

The image-forming apparatus 10 may update the NFC tag 30 so that the information regarding the NFC service, which is provided only to a user who obtained administration authority, is not provided to the NFC tag 30. According to another embodiment of the present invention, if the current image-forming apparatus 10 is operating in the administrator mode, the information regarding the NFC service, which is provided only to a user who obtained administration authority, is written to the NFC tag 30. Then, when the administrator logs out, the NFC tag 30 may be updated again so that the information regarding the NFC service, which is provided only to a user who obtained administration authority, is not written to the NFC tag 30. For example, the image-forming apparatus 10 may update the NFC tag 30 according to a log-in/out state.

If the NFC service, which will be provided to a user who obtained administration authority, is changed according to a user selection, the control unit 100 stores a changed NFC service policy in the storage unit 120.

Figure 11:
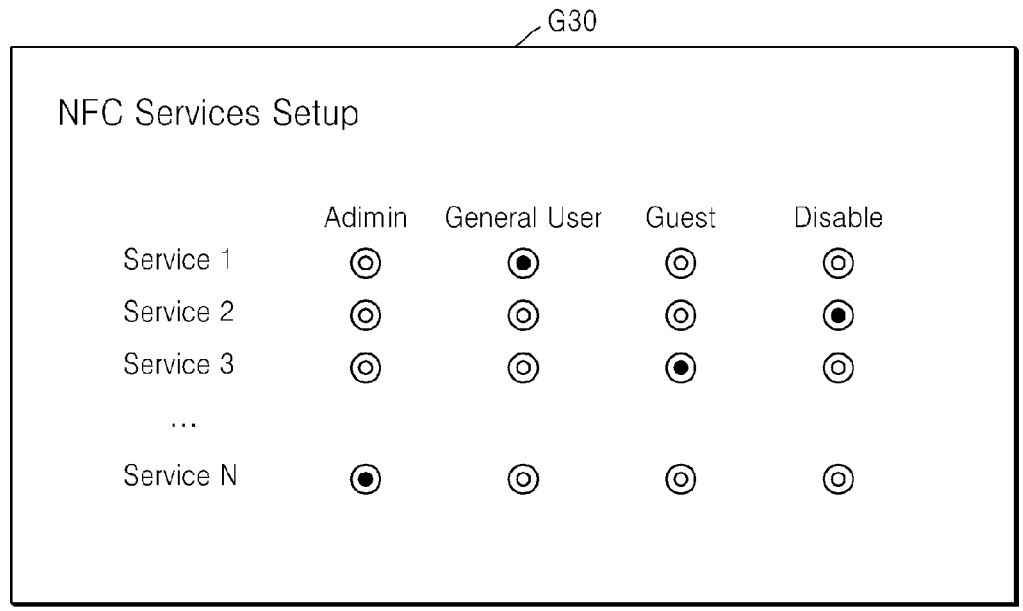

According to another embodiment of the present invention, the user interface 150 may display a GUI G30 which is shown in FIG. 11. The GUI G30 includes functions of the GUI G10, shown in FIG. 10, and of the GUI G11, shown in FIG. 11. Furthermore, the GUI G30 may receive a selection of an NFC service, which will be provided to a user who did not log in, that is, a guest. The NFC service, provided to a general user, includes an NFC service that is provided to the guest. However, the NFC service, provided to the guest, does not include an NFC service that is provided to the general user. A deactivated NFC service is not provided to the administrator, the general user, and the guest.

If the NFC service policy is changed via the GUI G30, the control unit 100 stores the changed NFC service policy in the storage unit 120. Additionally, the control unit 100 controls the NFC module 160 so as to update the NFC tag 30 according to the changed NFC service policy. The NFC module 160 may write the information regarding the NFC service, which is provided to a guest or a general user, to the NFC tag 30. However, as described above, if the information regarding the NFC service that is provided to an administrator is written to the NFC tag 30, and the administrator logs out, the NFC tag 30 may be updated. For example, information, which will be written to the NFC tag 30 in a log-out state, may be set as information about the NFC service that is provided to a general user or a guest by default.

Figure 12:
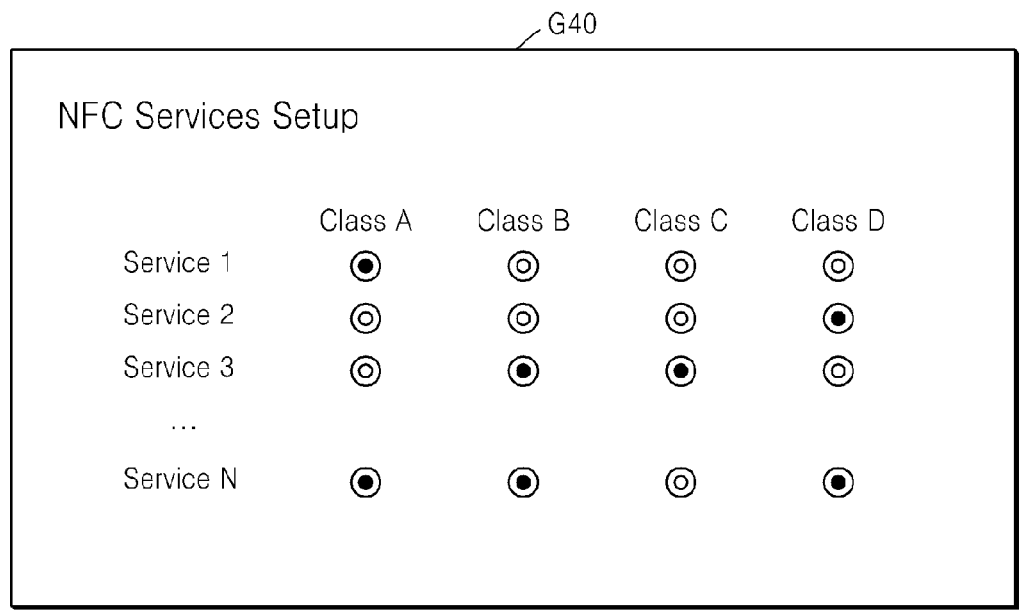

According to another embodiment of the present invention, the user interface 150 may display a GUI G40 that is shown in FIG. 12. According to the embodiment shown in FIG. 12, the NFC services are classified into four classes. A layer may or may not be present between the respective classes. If a layer is present, a user of an upper class may use all NFC services that are allowed for a user of a lower class. However, a user of a lower class may not use all NFC services that are allowed for a user of an upper class. An ID and a password of a user may be mapped to a class, and stored as an NFC service policy as shown in FIG. 14. According to the NFC service policy shown in FIG. 14, a mobile identifier is further included. The mobile identifier is information regarding the mobile terminal 20. The mobile identifier may denote a MAC address 1405 or a phone number 1410 of the mobile terminal, but is not limited thereto. The mobile identifier may be used for certification of the mobile terminal 20.

The GUI and NFC service policy changes, described above, may be provided only to a user that has administration authority. The GUI and NFC service policy changes are examples for understanding the spirit of embodiments of the present invention. Accordingly, the scope of embodiments of the present invention is not limited to any particular embodiment.

According to another embodiment of the present invention, the NFC module 160 may include an NFC chipset. If the NFC module 160 includes an NFC chipset (not shown), the NFC tag 30 may be omitted. The NFC chipset may include a transceiver antenna. In this case, the image-forming apparatus 10 and the mobile terminal 20 operate in a P2P mode, and thus, transmit data to the mobile terminal 10. That is, instead of updating the NFC tag 30, the NFC module 160 may transmit information, which may be written to the NFC tag 30 if the NFC tag 30 is updated, to the mobile terminal 20 in the P2P mode.

Figure 5:
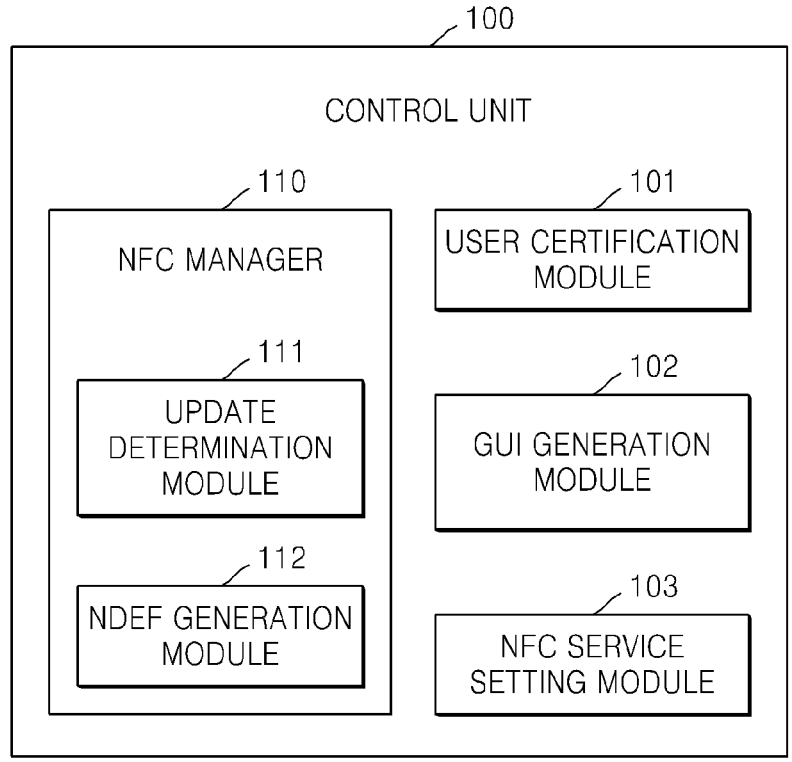
FIG. 5 is a diagram illustrating a control unit, included in the image-forming apparatus, according to an embodiment of the present invention.

FIG. 5 is a diagram illustrating the control unit 100, included in the image-forming apparatus 10, according to an embodiment of the present invention.

Referring to FIG. 5, the control unit 100 may include an NFC manager 110, a user certification module 101, a GUI generation module 102, and an NFC service setting module 103.

The user certification module 101 certifies user log-in information that is input via the user interface 150 shown in FIG. 4. The user certification module 101 may display a result of the certification via the user interface 150. If the user certification is successful, the user certification module 101 requests the NFC manager 110 to update the NFC tag 30. That is, the user certification module 101 requests the NFC manager 110 to update the NFC tag 30, so that only information regarding an NFC service, which is allowed for a currently logged-in user, is written to the NFC tag 30.

The NFC service setting module 103 generates and manages an NFC service policy. For example, the NFC service setting module 103 may generate the GUIs, shown in FIGS. 9 through 12, via the GUI generation module 102. The NFC service setting module 103 receives an input for setting of the NFC service policy via the GUI that is generated by the GUI generation module 102. If the NFC service policy is changed, the NFC service setting module 103 updates the NFC service policy that is stored in the storage unit 120. If the NFC service policy is changed, the NFC service setting module 103 requests the NFC manager 110 to update the NFC tag 30 according to the changed NFC service policy. The NFC manager 110 may include an update determination module 111 and a NDEF generation module 112.

The NFC manager 110 determines whether it is necessary to update the NFC tag 30 via the update determination module 111. If it is determined that it is necessary to update the NFC tag 30, the NFC manager generates an NDEF message via the NDEF generation module 112. The NFC manager 110 writes the generated NDEF message to the NFC tag 30.

The update determination module 111 determines whether it is necessary to update information that is written to the NFC tag 30. The update determination module 111 receives a request for updating the NFC tag 30 from the user certification module 101 or the NFC service setting module 103, so as to determine whether it is necessary to update information that is written to the NFC tag 30.

In another embodiment, the update determination module 111 periodically updates the NFC tag 30 according to information that is written to the NFC tag 30 or occurrence of a particular event. For example, information regarding consumables or a state of the image-forming apparatus 10 is written to the NFC tag 30, the information regarding consumables may be periodically written to the NFC tag 30. If an event, in which the image-forming apparatus 10 malfunctions when operating in a normal state, occurs, information about a cause of the malfunction and help information for solving the malfunction may be written to the NFC tag 30, but embodiments of the present invention are not limited thereto.

If a request for updating the NFC tag 30 is received from the user certification module 101 according to a user login, the update determination module 111 identifies an NFC service that is allowed for the logged-in user via the NFC service setting module 103. If information, written to the NFC tag 30, does not correspond to the logged-in user, the update determination module 111 may determine to replace the information about the NFC service, which is written to the NFC tag, with information about the NFC service, which is allowed for the logged-in user.

For example, if the logged-in user has administration authority, and only the NFS service that is allowed for a general user is written to the NFC tag 30, the update determination module 111 may determine to update the NFC tag 30. If the user logs out, the update determination module 111 may determine to write only the information that is allowed for the general user to the NFC tag 30 again.

In other words, the update determination module 111 may compare a NFC service that is allowed for a logged-in user to information that is written to the NFC tag 30, and thus, update the information that is written to the NFC tag 30. If the information about the NFC service that is not allowed for a user is written to the NFC tag 30, the update determination module 111 may determine to update the NFC tag 30. If the information about the NFC service that is allowed for a logged-in user is not written to the NFC tag 30, the update determination module 111 may determine to update the NFC tag 30. For example, if a logged-in user obtained administration authority, but only information about the NFC service that is allowed for a general user is written to the NFC tag 30, the update determination module 111 may determine to update the NFC tag 30.

In the case of a user log-out, whether to update the NFC tag 30 may be determined similarly to the user log-in. For example, when a user logs out, the update determination module 111 may determine to update the NFC tag 30 so as to write only information about the NFC service that is allowed for a general user to the NFC tag 30.

When an NFC service policy is changed and a request for updating the NFC tag 30 is received from the NFC service setting module 103, the update determination module 111 determines whether to update the NFC tag 30 according to the changed NFC service policy. This may be determined in consideration of the NFC service that is allowed for a logged-in user. For example, it is assumed that a logged-in user obtained administration authority, and all NFC services that are allowed for the user who obtained administration authority are written to the NFC tag 30. Then, it is assumed that an NFC service policy is changed so that one of the NFC services that was allowed only in the administrator mode is allowed in a general user mode. In this case, while the user who obtained administration authority logs in, it may be determined that it is not necessary to update the NFC tag 30. On the contrary, if an activated NFC service is deactivated, and thus, the NFC service policy is changed, it may be determined that it is necessary to update the NFC tag 30.

The above-described embodiments provide only some of various embodiments of the update determination method. Thus, other embodiments may be inferred from a disclosure of embodiments of the present invention.

When the update determination module 111 determines to update the NFC tag 30, the NDEF generation module 112 generates an NDEF message in consideration of an NDEF type. The NDEF generation module 112 generates an NDEF message so as to form an independent NDEF record for each NFC service unit. The NDEF generation module 112 collects information about the NFC service that is allowed for a user, so as to generate an NDEF message.

Information about the first service for automating a wireless connection between the mobile terminal 20 and the image-forming apparatus 10 may include a wireless connection method, a MAC address, an IP address, and/or PIN information for WPS certification with regard to the image-forming apparatus 10.

Information about the second service for copying a setting of the image-forming apparatus 10 to the mobile terminal 20, and thus, applying the setting to another image-forming apparatus may include information regarding a network setting such as a connection port, a security policy, a protocol, etc., a print setting such as a resolution, single/double-sided printing, a paper-feeding method, etc., and/or a scanning setting such as a resolution, an image compression method, an image type, color/black-and-white, etc.

Information about the third service for rendering content of the mobile terminal 20 to a cloud resource may include a uniform resource locator (URL) of the cloud resource or certification information for accessing the cloud resource.

Information about the fourth service for displaying information about an operation state and a consumable of the image-forming apparatus 10 on the mobile terminal 20 may include information regarding a remaining amount of ink/toner, whether the image-forming apparatus 10 is operating normally, firmware (FM) version information, and/or, if there is an error, a cause of and a solution to the error.

The NDEF generation module 112 reconfigures the collected information about the NFC service, and thus, generates an NDEF message. The NDEF generation module 112 may add an NFC service identifier to each NDEF record, so as to identify an NFC service of information that is written to the NDEF record.

The NFC manager 110 writes the NDEF message, which is generated by the NDEF generation module 112, to the NFC tag 30 via the NFC module 160.

Figure 6:
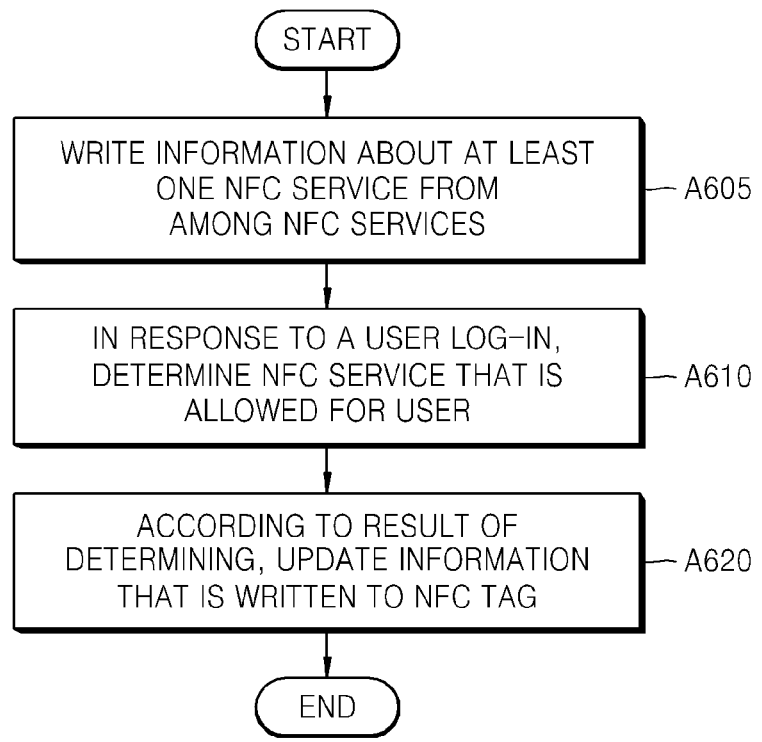
FIG. 6 is a flowchart for explaining a method, performed by the image-forming apparatus, of controlling service provision, according to an embodiment of the present invention.

FIG. 6 is a flowchart for explaining a method, performed by the image-forming apparatus 10, of controlling service provision according to an embodiment of the present invention. Descriptions, which have been provided above, will not be repeated here, and may be referred to above. It is assumed that an NFC service policy is set for the image-forming apparatus 10, prior to operation A605.

In operation A605, the image-forming apparatus 10 writes information regarding at least one NFC service, from among NFC services, to the NFC tag 30. For example, the image-forming apparatus 10 writes the information to the NFC tag 30 according to the NFC service policy.

In operation A610, in response to a user log-in, the image-forming apparatus 10 determines an NFC service that is allowed for the user. The image-forming apparatus 10 may determine an NFC service that is allowed for the user, according to the NFC service policy.

In operation A620, according to a result of the determining in operation A610, the image-forming apparatus 10 updates the information that is written to the NFC tag 30. The image-forming apparatus 10 compares the NFC service that is allowed for the user to the information that is written to the NFC tag 30. If the information regarding the NFC service that is not allowed for the user is written to the NFC tag 30 or if information regarding the NFC service that is allowed for a user is not written to the NFC tag 30, the image-forming apparatus 10 replaces or updates the information about the NFC service, which is written to the NFC tag, with the information about the NFC service, which is allowed for the logged-in user.

Figure 7:
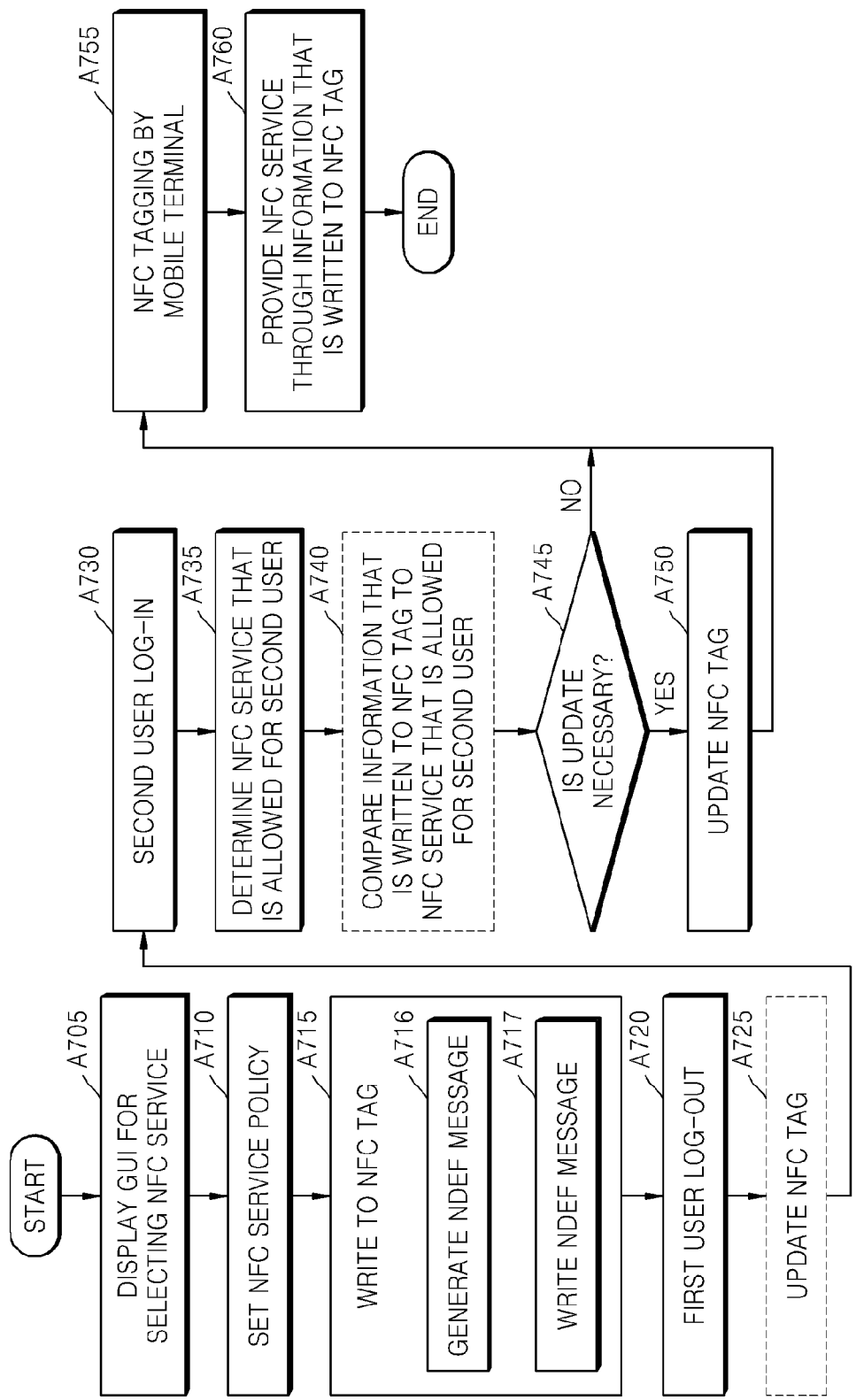
FIG. 7 is a flowchart for explaining a method, performed by the image-forming apparatus, of controlling service provision, according to another embodiment of the present invention.

FIG. 7 is a flowchart for explaining a method, performed by the image-forming apparatus 10, of controlling service provision, according to another embodiment of the present invention. At present, it is assumed that a first user is logged in to the image-forming apparatus 10. The first user may be an administrator.

In operation A705, according to a request made by the first user, the image-forming apparatus 10 displays a GUI for selecting an NFC service. The GUI for selecting the NFC service refers to a GUI that may change an NFC service policy.

In operation A710, as the NFC service is selected in operation A705, the image-forming apparatus 10 sets the NFC service policy.

As the NFC service policy is changed, in operation A715, the image-forming apparatus 10 writes information about the NFC service to the NFC tag 30, according to the changed NFC service policy. For example, the image-forming apparatus 10 collects the information about the NFC service by referring to the NFC service policy, and generates an NDEF message in operation A716. In operation A717, the image-forming apparatus 10 writes the generated NDEF message to the NFC tag 30.

In operation A720, upon a request made by the first user, the image-forming apparatus 10 logs out the first user.

As the first user logs out, in operation A725, the image-forming apparatus 10 updates the NFC tag 30. For example, as an administrator is logged out, the image-forming apparatus 10 writes only information about an NFC service, which is allowed for a guest, to the NFC tag 30.

In operation A730, the image-forming apparatus 10 receives log-in information about a second user, and then, the second user logs in. The second user is assumed to be a general user.

In operation A735, the image-forming apparatus 10 determines an NFC service that is allowed for the second user.

In operation A740, the image-forming apparatus 10 compares the information that is written to the NFC tag 30 to an NFC service that is allowed for the second user.

In operation A740, the image-forming apparatus 10 determines whether an update of the NFC tag 30 is necessary. If the update is necessary, the image-forming apparatus 10 updates the NFC tag 30.

Then, in operation A755, the mobile terminal 20 tags the NFC tag 30, and thus, reads the information that is written to the NFC tag 30. In operation A760, according to the information that is written to the NFC tag 30, the mobile terminal 20 requests the image-forming apparatus 10 for a NFC service, and the image-forming apparatus 10 provides the corresponding NFC service to the mobile terminal 20.

Figure 15A:
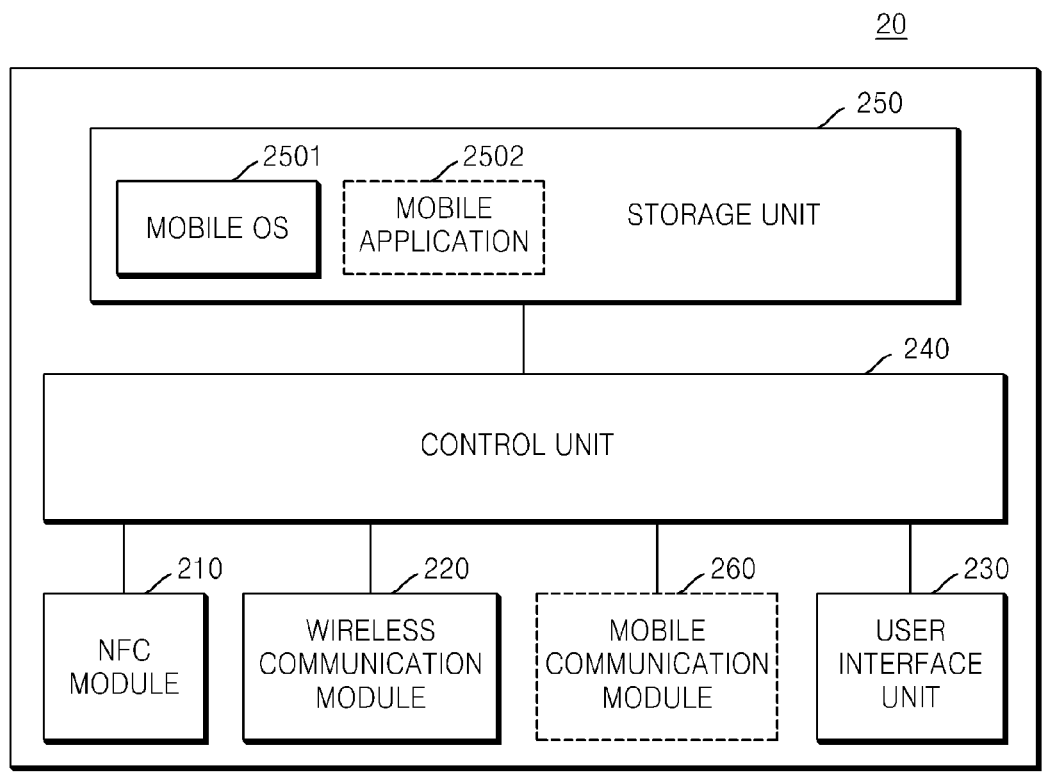
FIGS. 15A and 15B illustrate the mobile terminal according to an embodiment of the present invention.

FIG. 15A is a diagram illustrating the mobile terminal 20 according to an embodiment of the present invention. The mobile terminal may be implemented in various forms. For example, the mobile terminal 20, described herein, may include a cellular phone, a smart phone, a laptop computer, a digital broadcasting terminal, a personal digital assistant (PDA), a portable multimedia player (PMP), a navigation device, a tablet personal computer (PC), or the like.

Referring to FIG. 15A, the mobile terminal 20 may include an NFC module 210, a wireless communication module 220, a mobile communication module 260, a user interface 230, a control unit 240, and a storage unit 250. It may be understood by those of ordinary skill in the art that general-use elements, other than the above-described elements, may be further included in the mobile terminal 20. For example, the mobile terminal 20 may include general-use elements, such as a camera module, a digital multimedia broadcasting (DMB) module, a global positioning system (GPS) module, an image or voice processing processor, a power-supply unit, a vibration motor, a speaker, a microphone, a main board, or the like. Additionally, the elements, shown in FIG. 4, are not essential elements. The mobile terminal 20 may be implemented by using more or less elements than those shown in FIG. 15A. For example, if the mobile terminal 20 is a tablet PC which is used only on a wireless internet connection, the mobile communication module 260 may not be included.

Figure 15B:
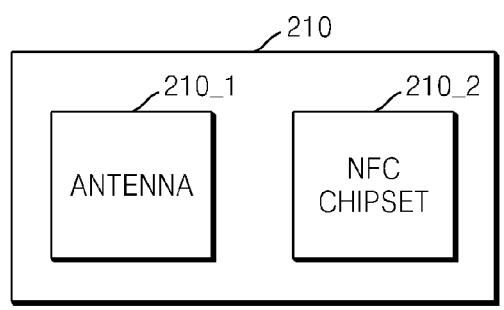

The NFC module 210 performs an NFC. Referring to FIG. 15B, the NFC module 210 may include an antenna 210_1 and an NFC chipset 210_2. The NFC chipset 210_2 includes circuit devices so that the NFC module 210 may operate in the reader/writer mode 301, the P2P mode 302, or the card emulation mode 303 in FIG. 2A. In the reader/writer mode, if the NFC tag 30 is located in a coverage of an radio frequency (RF) field (hereinafter referred to as NFC tagging), the NFC module 210 reads information that is written to the NFC tag 30 (in the reader mode), and writes or edits certain information to the NFC tag 30 (in the writer mode). Additionally, if the NFC module 210 is located nearby the image-forming apparatus 10 that includes the NFC chipset 210_2, shown in FIG. 15B, the NFC module 210 operates in the P2P mode 302, and thus, may execute bi-directional data transmission and reception. If the NFC module 210 operates in the card emulsion mode 303, the NFC module may operate similarly to the active or passive NFC tag 30.

The NFC module 210 obtains information that is written to the NFC tag 30 through the NFC tagging. The NFC module 210 may switch from the reader mode to the writer mode, according to a request made by the control unit 240.

The wireless communication module 220 may establish a wireless connection with the image-forming apparatus 10, and exchange data, which is necessary for image-forming work that will be described later, with the image-forming apparatus 10 via the wireless connection.

The mobile communication module 260 is connected to a circuit switching network (not shown) and a packet switching network (not shown). Thus, the mobile communication module 260 may transmit or receive data that is necessary for mobile communication, and download a certain application via the packet switching network.

The user interface 230 may be a touchscreen in which a user operates the mobile terminal 20, or information that is processed by the mobile terminal 20 is displayed.

The storage unit 250 may store a program for processing and controlling the control unit 240, and execute a function of storing data that is input/output. The storage unit 250 may store a mobile operating system (OS) 2501. The control unit 240 executes the mobile OS 2501, so as to control the mobile terminal 20. Additionally, the storage unit 250 may store a mobile printing application (hereinafter referred to as a mobile application 2502), for using a function of printing, scanning, or faxing performed by the image-forming apparatus 10. The mobile application 2502 interworks with the image-forming apparatus 10, so as to perform an image-forming work such as printing, scanning, or faxing. Additionally, the mobile terminal 20 may perform web storage, which involves a storage function of the storage unit 250, based on the internet connection.

The control unit 240 generally controls all functions of the mobile terminal 20. For example, the control unit 240 performs control and processing functions relating to content capture, a voice phone call, data communication, and/or a video phone call. The control unit 240 executes the mobile OS 2501 that is stored in the storage unit 250 and the mobile application 2502, so as to control the NFC module 210, the wireless communication module 220, the mobile communication module 260, the user interface 230, and/or the storage unit 250.

The mobile terminal 20 reads information that is written to the NFC tag 30 through NFC tagging. If information about a service that automates a wireless connection between the image-forming apparatus 10 and the mobile terminal 20 is written to the NFC tag 30, the mobile terminal 20 may output a screen like the GUI G50 shown in FIG. 16 and, at the same time, establish a wireless connection to the image-forming apparatus 10. A wireless connection between the image-forming apparatus 10 and the mobile terminal 20 may be executed upon request by a user, or automatically executed without request.

Figure 16:
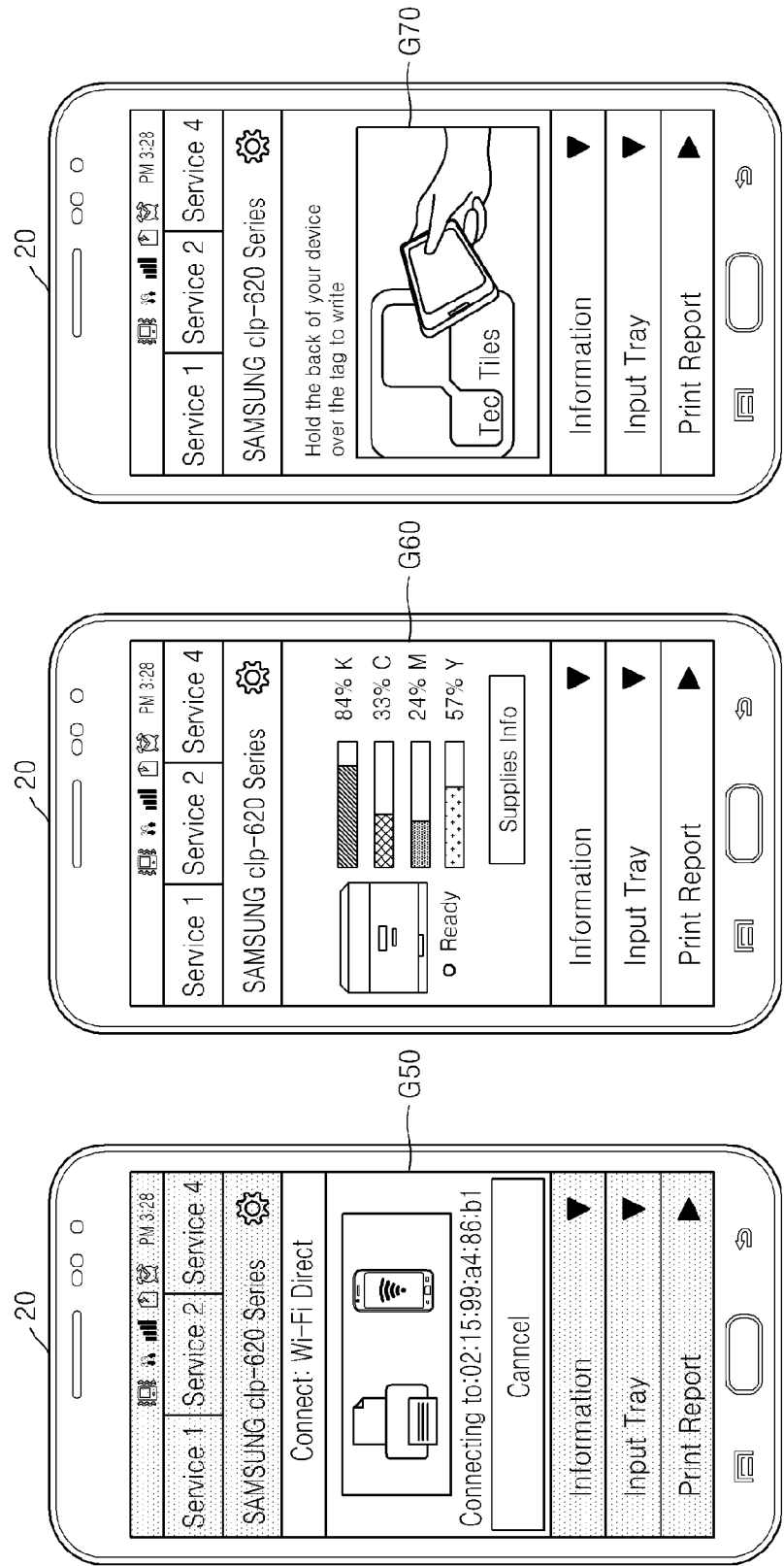
FIG. 16 is a diagram illustrating GUIs of the image-forming apparatus according to an embodiment of the present invention.

If information regarding a service for displaying information about an operation state and a consumable of the image-forming apparatus 10 on the mobile terminal 20, the mobile terminal 20 may output a screen like the GUI G60 shown in FIG. 16.

If information regarding a service for copying a setting of the image-forming apparatus 10 to the mobile terminal 20, and thus, applying the setting to another image-forming apparatus is written to the NFC tag 30, the mobile terminal 20 outputs a screen like the GUI G70 shown in FIG. 16, so as to guide tagging for the other image-forming apparatus. The mobile terminal 20 switches to the NFC writer mode, and when an NFC tag of the other image-forming apparatus is tagged, an apparatus setting of the image-forming apparatus 10 is written to the NFC tag of the other image-forming apparatus. The other image-forming apparatus may be set to be the same as the image-forming apparatus 10, through the information written to the NFC tag.

If information regarding a service for rendering content of the mobile terminal 20 to a cloud resource is written to the NFC tag 30, the mobile terminal 20 is connected to a cloud server, and transmits the content to be rendered to the cloud server. The mobile terminal 20 receives printing work data, which includes the rendered content, from the cloud server. The mobile terminal 20 transmits the printing work data to the image-forming apparatus 10, so as to execute printing.

If information regarding a service for scanning a document and transmitting the document to the mobile terminal 20 through the NFC tagging is written to the NFC tag 30, the mobile terminal 20 checks if an NFC scanning function may be executed, and activates the corresponding function of an application that is currently being executed. The mobile terminal 20 tags the NFC tag 30, and requests the image-forming apparatus 10 for document scanning. The mobile terminal 20 receives the scanned document from the image-forming apparatus 10. The NFC scanning function may include a function of automating a wireless connection between the image-forming apparatus 10 and the mobile terminal 20.

If information regarding a service for printing content of the mobile terminal 20 through the NFC tagging is written to the NFC tag 30, the mobile terminal 20 checks if an NFC printing function may be executed, and activates the corresponding function of an application that is currently being executed. The mobile terminal 20 tags the NFC tag 30, transmits the content to the image-forming apparatus 10, and then, requests the image-forming apparatus 10 for printing. The image-forming apparatus 10 prints the content. The NFC printing function may include a function of automating a wireless connection between the image-forming apparatus 10 and the mobile terminal 20.

As described above, according to the one or more of the above embodiments of the present invention, by dynamically configuring a service that is provided by an image-forming apparatus via NFC, a service may be prevented from being exposed to an unexpected user, and a service that is appropriate for a use environment may be provided.

In addition, other embodiments of the present invention may also be implemented through computer readable code/instructions in/on a medium, e.g., a computer readable medium, to control at least one processing element to implement any of the above described embodiments. The medium may correspond to any medium/media permitting the storage and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the present invention. The media may also be a distributed network, so that the computer readable code is stored/transferred and executed in a distributed fashion. Furthermore, the at least one processing element may include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method, performed by an image forming apparatus, of controlling service provision, the method comprising:
dynamically configuring a service provided by the image forming apparatus, comprising:
writing information about at least one near-field communication (NFC) service, from among NFC services that are provided based on NFC, to an NFC tag;
allowing a user to login via NFC to the image forming apparatus;
determining an NFC service that is allowed for the user in response to the user log in;
updating information that is written to the NFC tag according to a result of the determining; and
configuring the service using information updated in the NFC tag, dynamic configuration preventing the service from being exposed to an unauthorized use and allowing a service appropriate for a user environment of the user to be provided.

2. The method of claim 1, wherein the updating of the information that is written to the NFC tag is performed by replacing the information about the NFC service, which is written to the NFC tag, with the information about the NFC service, which is allowed for the user.

3. The method of claim 1, wherein the updating of the information that is written to the NFC tag is performed by updating the information that is written to the NFC tag, by comparing the NFC service that is allowed for the user to the information that is written to the NFC tag.

4. The method of claim 1, wherein the updating of the information that is written to the NFC tag is performed if information about an NFC service that is not allowed for the user is written to the NFC tag or if information regarding an NFC service that is allowed for the user is not written to the NFC tag.

5. The method of claim 1, further comprising, via a user interface, receiving a selection of an NFC service to be activated, from among the NFC services, and
wherein the writing is performed by writing information about the selected NFC service to the NFC tag.

6. The method of claim 1, further comprising,
receiving a selection of an NFC service to be provided to a user who obtained administration authority, from among the NFC services, via a user interface.

7. The method of claim 6, wherein the writing of the information about the NFC service is performed by writing information about remaining NFC services, other than the selected NFC service.

8. The method of claim 1, wherein the updating of the information that is written to the NFC tag is performed by updating information that is written to the NFC, according to whether the user obtained administration authority.

9. The method of claim 1, wherein the updating of the information that is written to the NFC tag comprises:
  generating an NFC data exchange format (NDEF) message that forms an independent NDEF record for each NFC service unit, by referring to the NFC service that is allowed for the user; and
  writing the NDEF message to the NFC tag.

10. The method of claim 1, further comprising, providing a NFC service to a mobile terminal by using the information that is written to the NFC tag, if the NFC tag is tagged by the mobile terminal.

11. The method of claim 10, wherein the NFC service comprises at least one from among a first service for automating a wireless connection between the mobile terminal and an image-forming apparatus, a second service for copying an apparatus setting of the image-forming apparatus to the mobile terminal and applying the setting to another image-forming apparatus, a third service for rendering content of the mobile terminal to a cloud resource, a fourth service for displaying information about an operation state and a consumable of the image-forming apparatus on the mobile terminal, a fifth service for scanning a document and transmitting the document to the mobile terminal through the NFC tagging, and a sixth service for printing content of the mobile terminal through the NFC tagging.

12. An image-forming apparatus that comprises at least one of a printing module, a scanner module, and a fax module, the image-forming apparatus comprising:
  dynamically configuring a service provided by the image forming apparatus, comprising:
    an NFC tag to which information about at least one near-field communication (NFC) service, from among NFC services that are provided based on NFC, is written;
    a user interface to receive an input of log-in information from a user;
    a control unit to determine an NFC service that is allowed for the user in response to log in of the user;
    an NFC module to update information that is written to the NFC tag according to a result of the determining; and
    configuring the service using information updated in the NFC tag, dynamic configuration preventing the service from being exposed to an unauthorized use and allowing a service appropriate for a user environment of the user to be provided.

13. The apparatus of claim 12, wherein the NFC module updates the information about the NFC service, which is written to the NFC tag, with the information about the NFC service, which is allowed for the user.

14. The of claim 12, wherein, by comparing the NFC service that is allowed for the user to the information that is written to the NFC tag, the controller controls the NFC module so as to update the information that is written to the NFC tag.

15. The of claim 12, wherein the control unit controls the NFC module so as to update the information that is written to the NFC tag, if information about an NFC service that is not allowed for the user is written to the NFC tag or if information regarding an NFC service that is allowed for the user is not written to the NFC tag 30.

16. The of claim 12, wherein the user interface displays a graphical user interface (GUI) for receiving a selection of an NFC service to be activated, from among the NFC services, and the NFC module writes information about the NFC service, which is selected via the user interface, to the NFC tag.

17. The of claim 12, wherein the user interface displays a GUI for receiving a selection of an NFC service to be provided to a user who obtained administration authority, from among the NFC services.

18. The of claim 17, wherein the NFC module writes information about remaining NFC services, other than the selected NFC service.

19. The apparatus of claim 12, wherein the controller controls the NFC module so as to update the information that is written to the NFC tag, according to whether the user obtained administration authority.

20. The of claim 12, wherein, by referring to the NFC service that is allowed for the user, the controller generates an NDEF message that forms an independent NDEF record for each NFC service unit, and the NFC module writes the NDEF message to the NFC tag.

* * * * *